Patented Aug. 2, 1927.

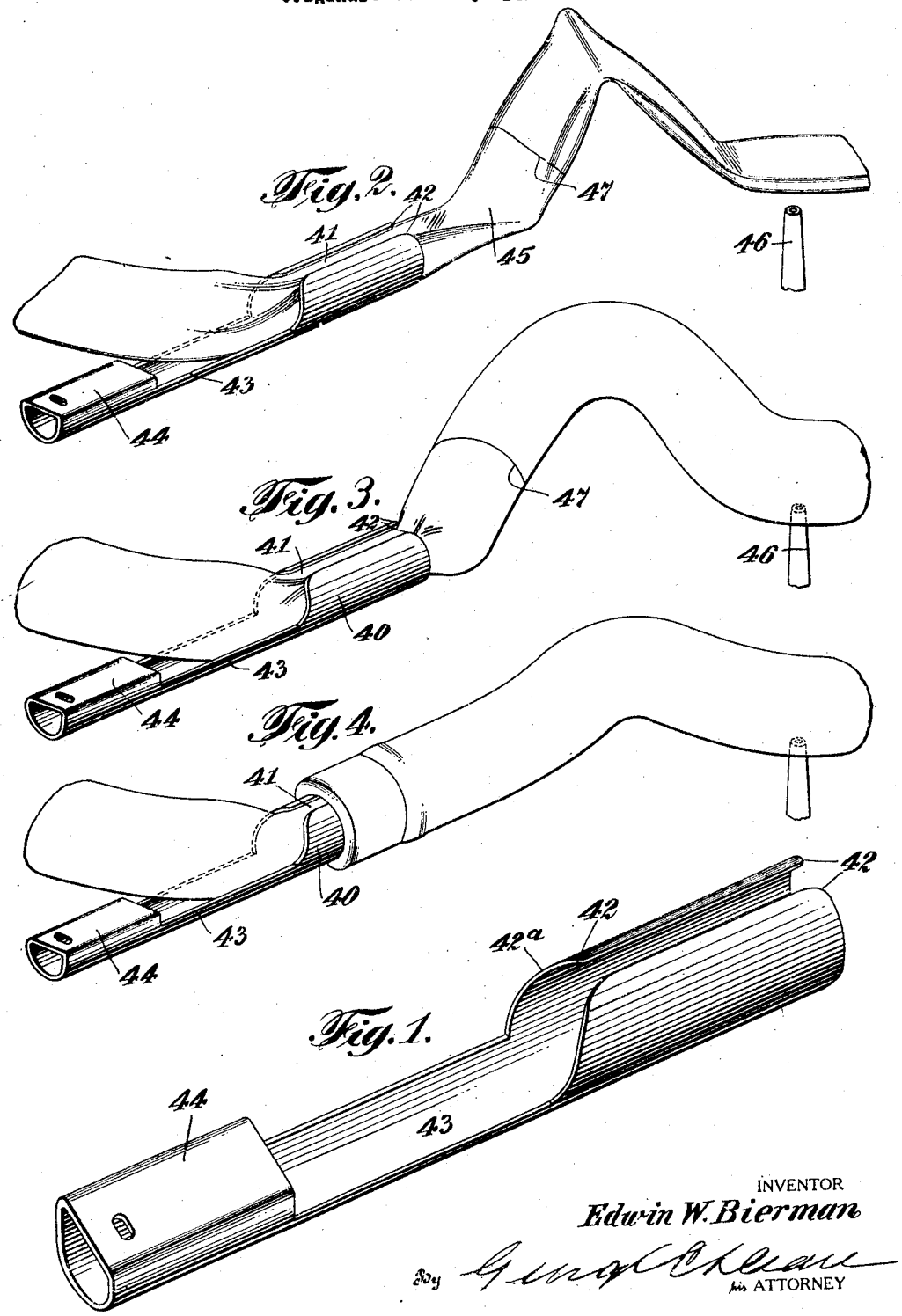

1,637,467

UNITED STATES PATENT OFFICE.

EDWIN W. BIERMAN, OF KEOKUK, IOWA, ASSIGNOR TO STANDARD FOUR TIRE CO., OF KEOKUK, IOWA, A CORPORATION OF IOWA.

CUFFING DEVICE FOR INNER TUBES.

Original application filed July 14, 1925, Serial No. 43,453. Divided and this application filed April 17, 1926. Serial No. 102,642.

My present invention relates to splicing endless or annular tubes of rubber or the like, such as the inner tubes commonly used in automobile tires and concerns more particularly an improved device for folding or cuffing the endless tube prior to its introduction into the vulcanizing machine. This device makes possible a method of cuffing which is extremely expeditious and simple, the tubes being delivered to the mold in properly folded position, and is readily inserted therein with the annular splice in contact with the mold walls.

The method of using the device includes inserting the deflated annular tube through a narrow slot in an approximately cylindrical mandrel, inflating the tube, folding the tube work over the mandrel to form a two-ply cuff, then deflating the tube and removing the same from the mandrel.

For the vulcanizing part of the method, the expander is run into the cuff and separated from the hot mold walls by two plies of tubing throughout a semi-circumference and four plies of tubing throughout the other semi-circumference.

The device may be more fully understood from the following description in connection with the accompanying drawings wherein:

Fig. 1 is a perspective view of the cuffing mandrel; and

Figs. 2, 3 and 4 are perspective views illustrating successive steps in the operation of cuffing the tube.

The cuffing device is shown in perspective in Fig. 1, where it will be noted that it includes a substantially cylindrical form 40, constituting a folding guide having a narrow longitudinally extending slot 41 therein, the end corners of which are curved as at 42 to prevent catching or tearing the tubes, and the rear edges are slanted as well as curved as at 42ª. A shank 43 forms an extension of one side of the cylindrical end 40 and terminates in a handle member 44 of approximately semi-circular cross-section. As seen in Fig. 2, the slot 41 permits a deflated tube 45 to be readily inserted within the cylindrical folding guide 40. After the tube has been inserted, it is inflated as in Fig. 3 through the usual air valve 46. This inflation makes the folding or cuffing operation very easy and the tube is folded back over the outside of the folding guide 40 in such a manner that the splice 47 therein is disposed on the outside of the double ply cuff. The tube is then deflated and the mandrel slipped out.

The properly cuffed tube is then ready to be inserted in the vulcanizing mold.

This application is a division of my prior application, Ser. No. 43,453, filed July 14, 1925.

I claim:

1. As a new article of manufacture, a cuffing device for an endless tube, including an approximately cylindrical tube-folding guide having a relatively wide slot therein through which the endless tube is adapted to be inserted prior to being folded back over the guide, said guide being of small diameter in comparison to the endless tube to be cuffed by it, thus permitting ready removal of the cuffed tube, and a shank forming a continuation of one side of the cylindrical guide member and terminating in a handle.

2. As a new article of manufacture, a cuffing device for an endless tube, including an approximately cylindrical tube-folding guide having a relatively wide slot therein through which the endless tube is adapted to be inserted prior to being folded back over the guide, said guide being of small diameter in comparison to the endless tube to be cuffed by it, thus permitting ready removal of the cuffed tube, and the corners of said slot being rounded to prevent tearing of a tube during its insertion in or its folding over the folding guide.

3. As a new article of manufacture, a cuffing device for an endless tube, including an approximately cylindrical tube-folding guide having a relatively wide slot therein through which the endless tube is adapted to be inserted prior to being folded back over the guide, said guide being of small diameter in comparison to the endless tube to be cuffed by it, thus permitting ready removal of the cuffed tube, and the forward corners of said slot being rounded and the rear edges of said guide adjacent said slot being sloped forwardly to prevent tearing of a tube during its insertion in or its folding over the folding guide.

Signed at Keokuk in the county of Lee and State of Iowa, this 14th day of April, A. D. 1926.

EDWIN W. BIERMAN.